Figure 1:
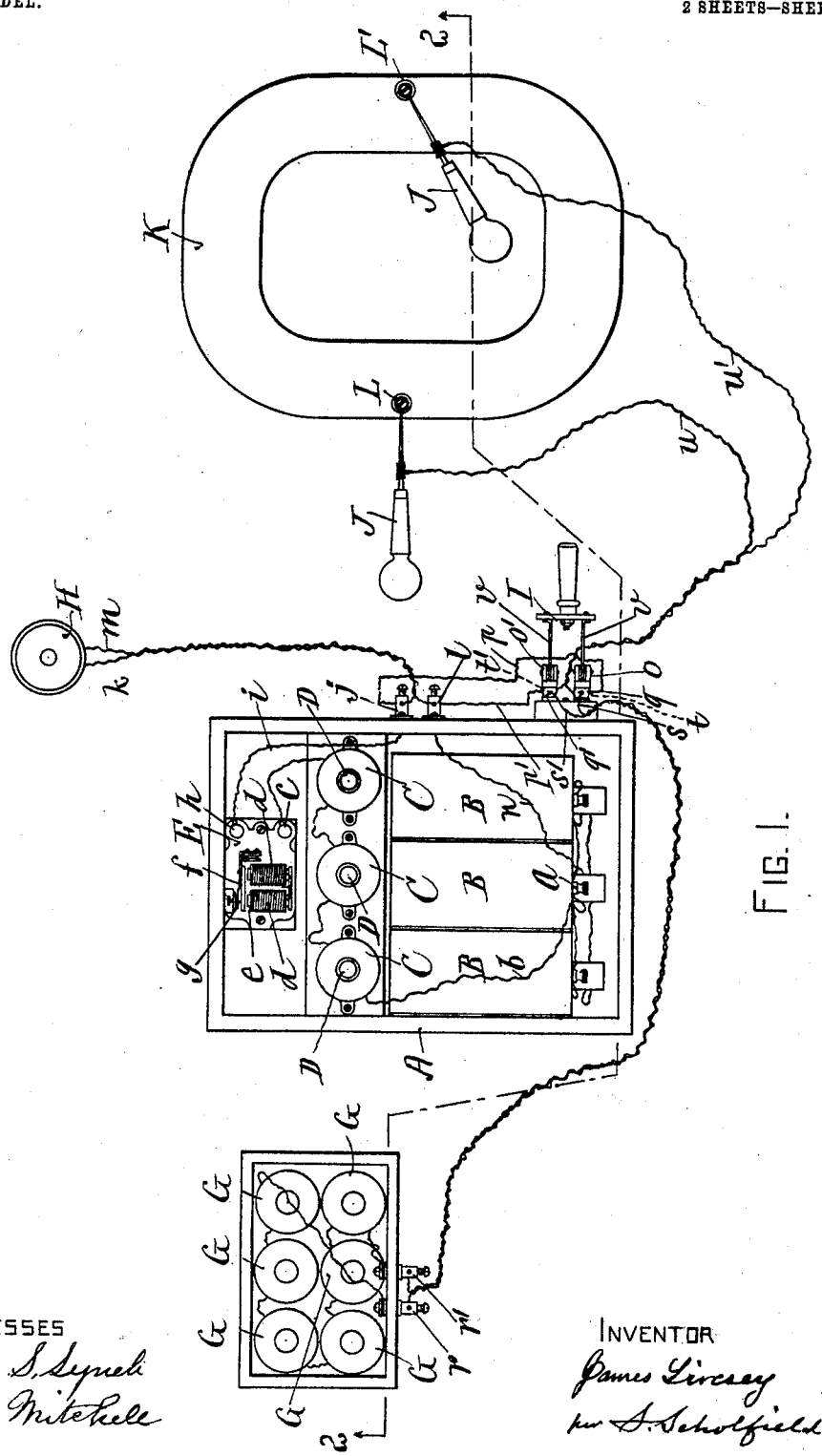

No. 756,665. PATENTED APR. 5, 1904.
J. LIVESEY.
APPARATUS FOR TESTING THE INSULATION OF THE COILS
OF ELECTROMAGNETS.
APPLICATION FILED FEB. 1, 1904.
NO MODEL. 2 SHEETS—SHEET 1.

WITNESSES
John S. Lynch
John Mitchell

INVENTOR
James Livesey
per S. Scholfield
ATTY.

No. 756,665. PATENTED APR. 5, 1904.
J. LIVESEY.
APPARATUS FOR TESTING THE INSULATION OF THE COILS
OF ELECTROMAGNETS.
APPLICATION FILED FEB. 1, 1904.
NO MODEL. 2 SHEETS—SHEET 2.
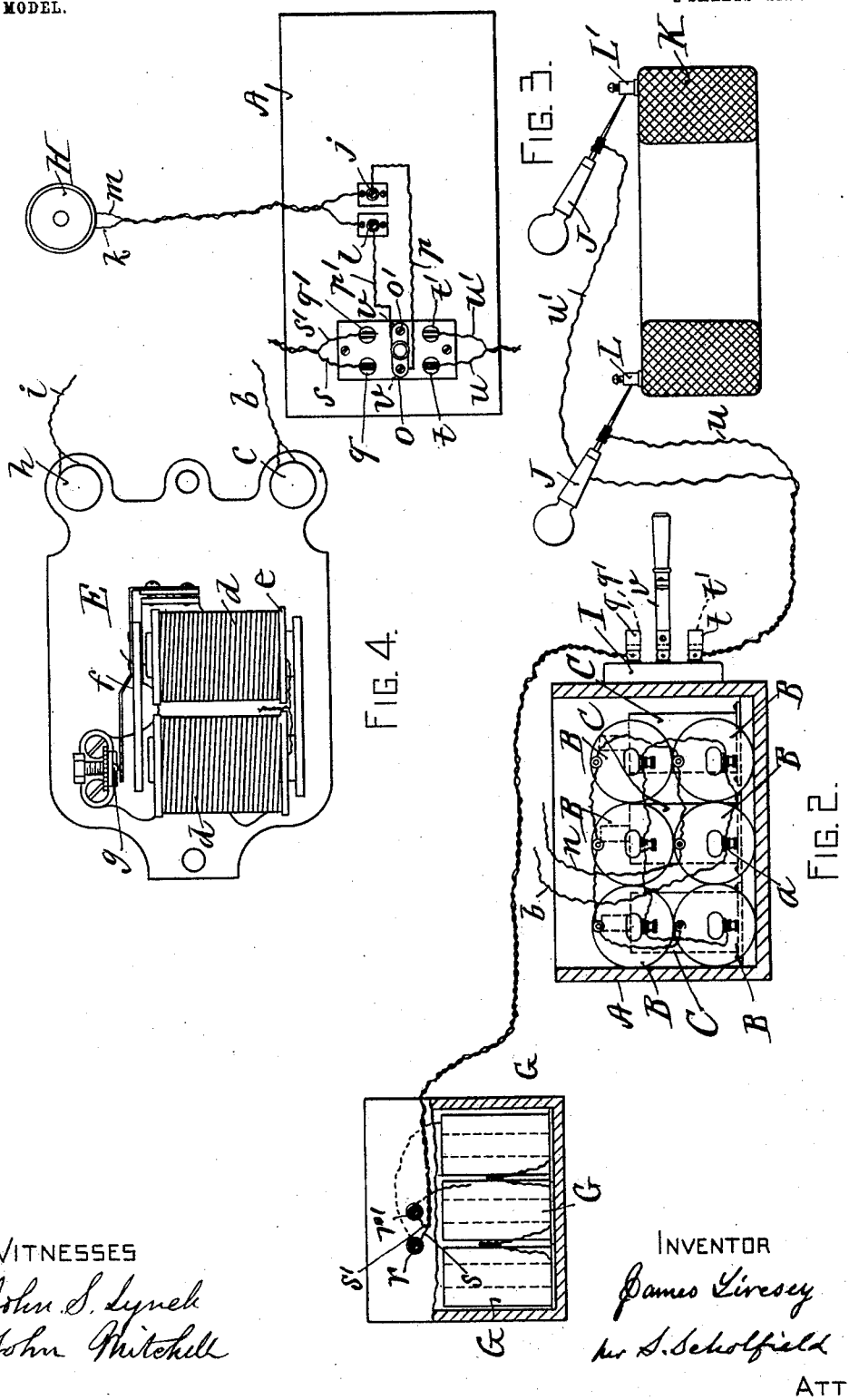
WITNESSES
John S. Lynch
John Mitchell
INVENTOR
James Livesey
per S. Scholfield
ATTY.

No. 756,665. Patented April 5, 1904.

UNITED STATES PATENT OFFICE.

JAMES LIVESEY, OF FALL RIVER, MASSACHUSETTS, ASSIGNOR TO HIMSELF AND ROBERT HEALY, OF FALL RIVER, MASSACHUSETTS.

APPARATUS FOR TESTING THE INSULATION OF THE COILS OF ELECTROMAGNETS.

SPECIFICATION forming part of Letters Patent No. 756,665, dated April 5, 1904.

Application filed February 1, 1904. Serial No. 191,617. (No model.)

*To all whom it may concern:*

Be it known that I, JAMES LIVESEY, a citizen of the United States, residing at Fall River, county of Bristol, in the State of Massachusetts, have invented a new and useful Apparatus for Testing the Insulation of the Coils of Electromagnets, of which the following is a specification.

The nature of my invention consists in the employment of an electric buzzer for determining by means of the resulting difference in sound the comparative quality of the insulation of a magnet-coil which is to be tested with that of a standard sounding-coil and also in the improved arrangement of the parts of the apparatus, as hereinafter set forth.

In the accompanying drawings, Figure 1 represents a top view of the apparatus. Fig. 2 represents a vertical section taken in the line 2 2 of Fig. 1, the box for holding the standard sounding-coils being shown in partial section. Fig. 3 represents a side view of the box for holding the battery and showing a face view of the switch. Fig. 4 represents an enlarged top view of the electric buzzer, by the action of which the sound employed for testing the insulation of the coil is produced.

In the drawings, A represents a wooden case in which is placed the series of galvanic batteries B B, which may be wired with each other, either in series or in multiple, as desired. In the same box with the batteries B are placed the resistance-coils C C and also the electric buzzer E, from which electric connection is made with the telephone-receiver H, by means of which when placed to the ear the varying qualities of the different sound produced by the action of the buzzer can be readily discerned.

The double-throw switch I is attached to the outer side of the case A, and J J are the contact-awls, by means of which electric connection may be made at will either to any fractional portion of the wire coil K by penetrating the insulation or to the binding-posts L L' at the opposite ends of the coiled wire, as shown in the drawings.

From the binding-post $a$ at the positive pole of the battery B the electric current follows the wire $b$ to the resistance-coils C C, thence through the said coils to the binding-post $c$ of the buzzer, and thence through the coils $d$ $d$ of the electromagnet $e$ and to the spring-actuated vibrator $f$, which engages with the electric contact-point $g$, the said vibrator being held against the contact-point by the action of the spring and withdrawn therefrom by the action of the magnet, and the resulting rapid vibration will produce a distinct buzzing sound which will vary in intensity and degree according to the strength of the electric current passing through the circuit, which in a coil of perfect insulation will be much greater than through an imperfectly-insulated coil. The electric current passes from the electric contact-point $g$ to the binding-post $h$, and thence through the wire $i$ to the binding-post $j$, and from the post $j$ electric connection is made through the wire $k$ to the magnet-coil of the telephone-receiver H, and from the said coil of the receiver electric connection is made to the binding-post $l$ by means of the wire $m$, and from the binding-post $l$ connection is made to the negative pole of the battery by means of the wire $n$, thus completing an electric circuit; but in this case, when the circuit is closed, the resistance of the magnet-coil of the telephone-receiver will be sufficient to prevent the action of the magnet of the buzzer upon the spring-actuated armature, so that no sound will be emitted until further electric connection has been made. From the binding-post $j$ connection is made to the hinge-post $o$ of the double-throw switch I by means of the wire $p$ and from the binding-post $l$ to the hinge-post $o'$ of the switch by means of the wire $p'$, and from the upper contact-posts $q$ $q'$ of the switch electric connection is made with the binding-posts $r$ $r'$ of the standard sounding-coils G G by means of the wires $s$ $s'$, and from the lower contact-posts $t$ $t'$ of the switch electric connection is made with the contact-making awls J J by by means of the wires $u$ $u'$.

Now when the awls J J are placed in proper connection with the ends of the wire of the coil K the insulation of which is to be tested and the contact-blades $v$ $v$ of the switch I brought down to contact with the posts $t\ t'$, so that the electric current will be passed around the coil K, the current then passing from the battery B will be sufficient to cause the required intermittent action of the magnet $e$ of the buzzer, thus producing a sound of a certain degree of volume or intensity in accordance with the degree of insulation, and then upon reversing the blades of the switch I, so that the electric circuit will be passed around the sounding-coils G G, which are of perfect insulation, the difference in the sounds produced by the buzzer under both conditions will be readily appreciated and the comparative degree of defective insulation in the coil K be readily estimated.

The apparatus may be employed without the telephone-receiver and without the resistance-coils C and magnets D; but by the employment of these devices the sounds are rendered less harsh and slight variations in degree and quality are more readily detected.

I claim as my invention—

1. In an apparatus for testing the insulation of magnet-coils, the combination of a means for generating electricity, and an electric buzzer arranged in the circuit, with a standard sounding-coil, and means for making electric connection at will, with the coil to be tested, and with the standard sounding-coil, substantially as described.

2. In an apparatus for testing the insulation of magnet-coils, the combination of a means for generating electricity, and an electric buzzer arranged in the circuit with a standard sounding-coil, a telephone-receiver, and means for making electric connection at will, with the coil to be tested, and with the standard sounding-coil, substantially as described.

3. In an apparatus for testing the insulation of magnet-coils, the combination of a galvanic battery, a resistance-coil, and an electric buzzer arranged in the circuit, with a standard sounding-coil, and means for making electric connection at will, with the coil to be tested, and with the standard sounding-coil, substantially as described.

4. In an apparatus for testing the insulation of magnet-coils, the combination of a galvanic battery, a resistance-coil surrounding a core-magnet, and an electric buzzer arranged in the circuit, with a standard sounding-coil, and means for making electric connection at will, with the coil to be tested, and with the standard sounding-coil, substantially as described.

5. In an apparatus for testing the insulation of magnet-coils, the combination of a means for generating electricity, and an electric buzzer arranged in the circuit, with a standard sounding-coil, electric connection with the coil to be tested, and with the standard sounding-coil, and a two-pole switch for changing the electric current from the one to the other at will, substantially as described.

JAMES LIVESEY.

Witnesses:
MAUDE E. PREER,
HENRY H. EARL.